(12) United States Patent
Nomoto

(10) Patent No.: US 12,741,340 B2
(45) Date of Patent: Sep. 22, 2026

(54) MANUFACTURING METHOD OF GALLIUM NITRIDE SUBSTRATE

(71) Applicant: DISCO CORPORATION, Tokyo (JP)

(72) Inventor: Asahi Nomoto, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 441 days.

(21) Appl. No.: 18/492,220

(22) Filed: Oct. 23, 2023

(65) Prior Publication Data

US 2024/0149379 A1 May 9, 2024

(30) Foreign Application Priority Data

Nov. 1, 2022 (JP) ................................ 2022-175685

(51) Int. Cl.
*B23K 26/53* (2014.01)
*B23K 26/062* (2014.01)
(Continued)

(52) U.S. Cl.
CPC .......... *B23K 26/53* (2015.10); *B23K 26/0676* (2013.01); *B28D 5/0011* (2013.01); (Continued)

(58) Field of Classification Search
None
See application file for complete search history.

(56) References Cited

U.S. PATENT DOCUMENTS

2010/0304552 A1* 12/2010 Kurita .................... H10P 36/20 257/E21.318
2011/0068434 A1 3/2011 Yamaguchi et al.
(Continued)

FOREIGN PATENT DOCUMENTS

JP 2011071180 A 4/2011
JP 2011084469 A 4/2011
(Continued)

OTHER PUBLICATIONS

Office Action issued in counterpart Japanese patent application No. 2022-175685, dated Apr. 28, 2026.

*Primary Examiner* — Jeff W Natalini
*Assistant Examiner* — Jacob Raul Marin
(74) *Attorney, Agent, or Firm* — Greer, Burns & Crain, Ltd.

(57) ABSTRACT

A manufacturing method of a gallium nitride (GaN) substrate includes a peeling layer forming step of forming a peeling layer at a depth, which corresponds to a thickness of the gallium nitride substrate to be manufactured, by relatively moving a GaN ingot and a focal point of a laser beam of a wavelength, which transmits through GaN, along a direction of a crystal orientation of the ingot as represented by the below-described formula (1) with the focal point positioned inside the ingot, and peeling the GaN substrate from the ingot using the peeling layer as a start point. The peeling layer forming step is set such that the laser beam is split to form a plurality of focal points and straight lines connecting the individual split focal points each extend along a direction parallel to the direction of the crystal orientation represented by the below-described formula (1).

$$\langle 1\ 1\ \bar{2}\ 0 \rangle \qquad \text{Formula (1)}$$

14 Claims, 6 Drawing Sheets

(51) Int. Cl.

| | |
|---|---|
| ***B23K 26/067*** | (2006.01) |
| ***B23K 26/08*** | (2014.01) |
| ***B28D 5/00*** | (2006.01) |
| *B23K 26/0622* | (2014.01) |
| *B23K 26/082* | (2014.01) |

(52) U.S. Cl.

CPC ........ *B28D 5/0094* (2013.01); *B23K 26/0622* (2015.10); *B23K 26/0626* (2013.01); *B23K 26/082* (2015.10); *B23K 26/0823* (2013.01); *B28D 5/0064* (2013.01)

(56) References Cited

U.S. PATENT DOCUMENTS

| | | | | |
|---|---|---|---|---|
| 2016/0305042 | A1* | 10/2016 | Hirata | C30B 29/406 |
| 2020/0230748 | A1 | 7/2020 | Ikeno et al. | |
| 2020/0269357 | A1 | 8/2020 | Omori et al. | |
| 2023/0234169 | A1* | 7/2023 | Iga | B23K 26/70 |
| 2023/0398640 | A1* | 12/2023 | Nomoto | B23K 26/0622 |

FOREIGN PATENT DOCUMENTS

| | | | | |
|---|---|---|---|---|
| JP | 2017057103 | A | 3/2017 | |
| JP | 2018133487 | A | 8/2018 | |
| JP | 2020131259 | A | 8/2020 | |
| WO | WO-2019146478 | A1 * | 8/2019 | H01S 5/3214 |

* cited by examiner

MANUFACTURING METHOD OF GALLIUM NITRIDE SUBSTRATE

BACKGROUND OF THE INVENTION

Field of the Invention

The present invention relates to a manufacturing method of a gallium nitride substrate.

Description of the Related Art

The use of gallium nitride (GaN) as devices such as power devices and light emitting diodes (LEDs) is under study for its band gap three times greater than that of silicon (Si). A gallium nitride substrate (GaN substrate) is known to be sliced from a gallium nitride ingot (GaN ingot) using an inner diameter blade that can be formed thinner in blade thickness than an outer diameter blade (see, for example, JP 2011-084469A).

SUMMARY OF THE INVENTION

Even when sliced from a GaN ingot using an inner diameter blade, however, there is an uneconomical problem in that when sliced, the GaN ingot is cut off and discarded as much as 60% to 70% because the inner diameter blade has a thickness as great as, for example, approximately 0.3 mm.

The present invention therefore has as an object thereof the provision of a manufacturing method of a gallium nitride substrate, which can efficiently slice and manufacture the gallium nitride substrate from a gallium nitride ingot.

In accordance with an aspect of the present invention, there is provided a manufacturing method of a gallium nitride substrate from a gallium nitride ingot having a first surface and a second surface on a side opposite to the first surface, the method including a holding step of holding the gallium nitride ingot, a peeling layer forming step of forming a peeling layer at a depth, which corresponds to a thickness of the gallium nitride substrate to be manufactured, by relatively moving the gallium nitride ingot and a focal point of a laser beam of a wavelength, which transmits through gallium nitride, along a direction of a crystal orientation of the gallium nitride ingot as represented by the below-described formula (1) with the focal point positioned inside the gallium nitride ingot from the first surface, and a peeling step of peeling the gallium nitride substrate from the gallium nitride ingot using the peeling layer as a start point. The peeling layer forming step is set such that the laser beam is split to form a plurality of focal points and straight lines connecting the individual split focal points each extend along a direction parallel to the direction of the crystal orientation represented by the below-described formula (1).

$$\langle 1\ 1\ \bar{2}\ 0 \rangle \quad \text{Formula (1)}$$

Preferably, in the peeling layer forming step, at least one of the straight lines connecting the individual split focal points may be set so as to intersect a direction along which the gallium nitride ingot and the focal points are relatively moved and extend along the direction parallel to the direction of the crystal orientation represented by the formula (1).

Preferably, in the peeling layer forming step, a relative moving speed between the gallium nitride ingot and the focal points may be set such that straight lines connecting adjacent processing marks formed by relatively moving the gallium nitride ingot and the focal points are each formed along the direction of the crystal orientation represented by the formula (1).

The peeling layer forming step is set so that the laser beam is split to form the focal points and the straight lines connecting the individual split focal points each extend along the direction parallel to the direction of a specific one crystal orientation included in the set of crystal orientations as represented by the above-described formula (1). The present invention can therefore suppress the possibility of occurrence of cracks that cause an increase of irregularities of severed surfaces, thereby enabling to efficiently slice and manufacture the gallium nitride substrate from the gallium nitride ingot.

The above and other objects, features and advantages of the present invention and the manner of realizing them will become more apparent, and the invention itself will best be understood from a study of the following description and appended claims with reference to the attached drawings showing or illustrating a preferred embodiment of the invention.

BRIEF DESCRIPTION OF THE DRAWINGS

FIGS. 6A to 6D are top views illustrating splitting of a laser beam in the peeling layer forming step in FIG. 3;

DETAILED DESCRIPTION OF THE PREFERRED EMBODIMENT

With reference to the attached drawings, a description will be made in detail regarding an embodiment of the present invention. However, the present invention shall not be limited by details that will be described in the subsequent embodiment. The elements of configurations that will hereinafter be described include those readily conceivable to persons skilled in the art and substantially the same ones. Further, the configurations that will hereinafter be described can be combined appropriately. Furthermore, various omissions, replacements, or modifications of configurations can be made without departing from the spirit of the present invention.

Figure 1:
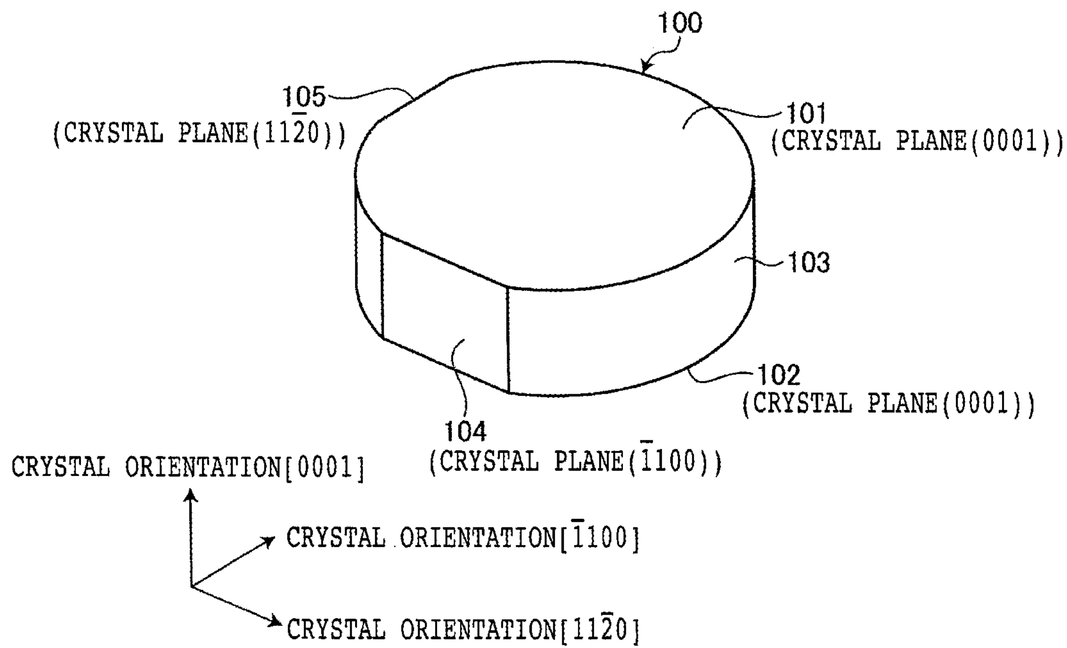
FIG. 1 is a perspective view illustrating an example of a gallium nitride ingot for use in a manufacturing method according to an embodiment of the present invention for a gallium nitride substrate.
Figure 2:
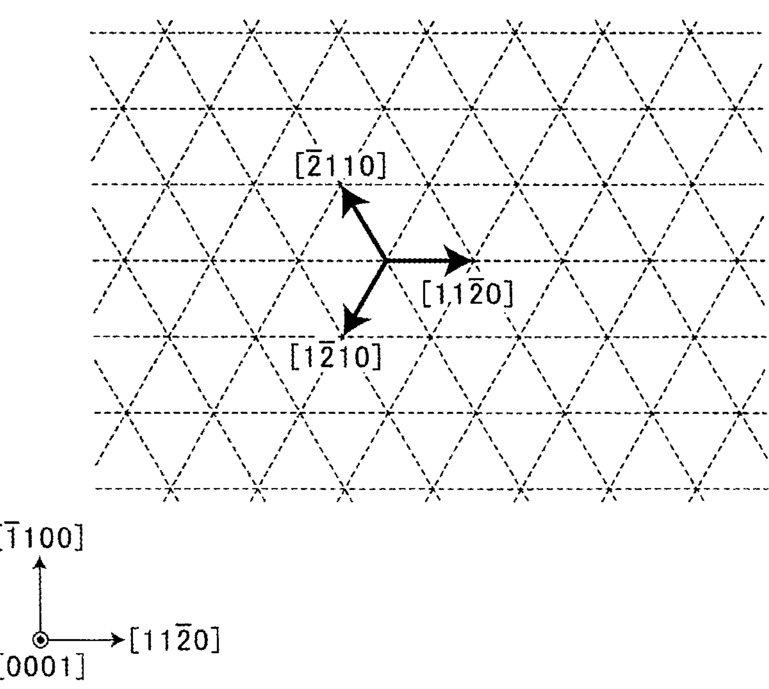
FIG. 2 is a top view illustrating crystal orientations of the gallium nitride ingot of FIG. 1.

A manufacturing method according to the embodiment of the present invention for a gallium nitride substrate will be described on the basis of the drawings. FIG. 1 is a perspective view illustrating a gallium nitride ingot 100 as an example of a gallium nitride ingot for use in the manufacturing method according to the embodiment. FIG. 2 is a top view illustrating crystal orientations of the gallium nitride ingot 100 of FIG. 1. The manufacturing method according to the embodiment is a method that manufactures a gallium nitride substrate (GaN substrate, GaN wafer) 130 (see FIG. 9) from the gallium nitride ingot (GaN ingot) 100. The GaN ingot 100 is a single crystal of gallium nitride (GaN), which has a hexagonal crystal structure. However, no particular limitation is imposed on the conductivity type of the GaN ingot 100. The GaN ingot 100 may be of a p-type that contains a p-type dopant such as magnesium (Mg) or beryllium (Be) or may be of an n-type that contains an n-type dopant such as silicon (Si) or germanium (Ge).

As illustrated in FIG. 1, the GaN ingot 100 in this embodiment is formed cylindrical as a whole, and has a first surface 101 that is exposed upward and is planar and circular, a second surface 102 that is exposed downward on a side opposite to the first surface 101, and a peripheral surface 103 located between the first surface 101 and the second surface 102. It is to be noted that the GaN ingot 100 has a diameter of 4 inches (approximately 100 mm) and a thickness of 500 μm although its diameter and thickness are not limited to these values.

On the peripheral surface 103 of the GaN ingot 100, planar rectangular orientation flats 104 and 105 are formed as illustrated in FIG. 1. Without being limited to these in the present invention, the GaN ingot 100 may include, instead of the orientation flats 104 and 105, notches that are formed at similar positions and extend in the direction of an axis orthogonal to the first surface 101 and the second surface 102.

In the specification, crystal orientations and crystal planes of the single crystal of GaN are specified using Miller indices. In the specification, specific crystal orientations are represented using [ ], and a set of crystal orientations that are equivalent to one another because of the symmetry of the crystal structure is represented using < >. On the other hand, specific crystal planes are represented using ( ), and a set of crystal planes that are equivalent to one another because of the symmetry of the crystal structure is represented using { }.

As illustrated in FIG. 1, the first surface 101 and the second surface 102 correspond to the below-described crystal plane (1-1) and are perpendicular to the below-described crystal orientation (2-1). The orientation flat 104 is planar, corresponds to the below-described crystal plane (1-2), and is perpendicular to the below-described crystal orientation (2-2). The orientation flat 105 is planar, corresponds to the below-described crystal plane (1-3), and is perpendicular to the below-described crystal orientation (2-3). In other words, the GaN ingot 100 is manufactured such that the below-described crystal plane (1-1) is exposed on both the first surface 101 and the second surface 102, the below-described crystal plane (1-2) is exposed on the orientation flat 104, and the below-described crystal plane (1-3) is exposed on the orientation flat 105. The crystal orientations (2-1), crystal orientation (2-2), and crystal orientation (2-3) are perpendicular to one another. Therefore, the orientation flat 104 is formed parallel to the crystal orientation (2-3), and the orientation flat 105 is formed parallel to the crystal orientation (2-2).

$(0\ 0\ 0\ 1)$ Crystal plane (1-1)

$(\bar{1}\ 1\ 0\ 0)$ Crystal plane (1-2)

-continued $(1\ 1\ \bar{2}\ 0)$ Crystal plane (1-3)

$[0\ 0\ 0\ 1]$ Crystal orientation (2-1)

$[\bar{1}\ 1\ 0\ 0]$ Crystal orientation (2-2)

$[1\ 1\ \bar{2}\ 0]$ Crystal orientation (2-3)

Three crystal orientations (2-3), (2-4), and (2-5), which are illustrated in FIG. 2 and form an angle of 120° with respect to one another, all belong to a set of crystal orientations equivalent to one another because of the symmetry of the hexagonal crystal structure of the GaN ingot 100, the set being represented by the below-described formula (1).

$$\left[\begin{array}{ll}[1\ 1\ \bar{2}\ 0] & \ldots \text{ Crystal orientation } (2\text{-}3)\\ [1\ \bar{2}\ 1\ 0] & \ldots \text{ Crystal orientation } (2\text{-}4)\\ [\bar{2}\ 1\ 1\ 0] & \ldots \text{ Crystal orientation } (2\text{-}5)\end{array}\right] \rightarrow \langle 1\ 1\ \bar{2}\ 0\rangle \quad \ldots \text{ Formula (1)}$$

The GaN ingot 100 has a property that a cleavage plane is harder to be formed in the below-described set of crystal planes (3-3), which includes the crystal plane (1-3), than in the below-described set of crystal planes (3-1) including the crystal plane (1-1) and the below-described set of crystal planes (3-2) including the crystal plane (1-2). In other words, the GaN ingot 100 has a property that it is harder to be cleaved along the set of crystal planes (3-3) than along the set of crystal planes (3-1) and the set of crystal planes (3-2).

$\{0\ 0\ 0\ 1\}$ Crystal plane (3-1)

$\{\bar{1}\ 1\ 0\ 0\}$ Crystal plane (3-2)

$\{1\ 1\ \bar{2}\ 0\}$ Crystal plane (3-3)

Figure 3:
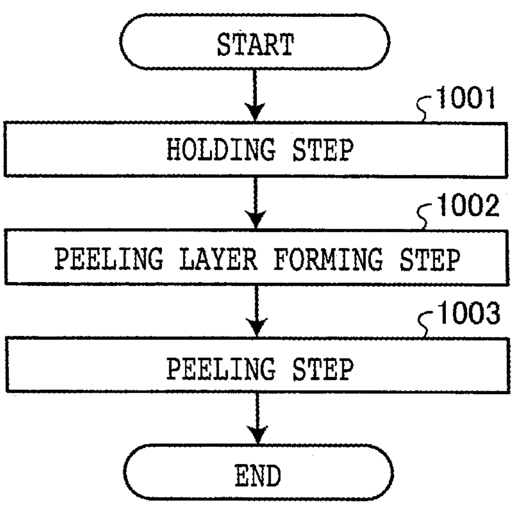
FIG. 3 is a flow chart illustrating processing procedures of the manufacturing method according to the embodiment for the gallium nitride substrate.

The specification will next describe the manufacturing method according to this embodiment on the basis of the drawings. FIG. 3 is a flow chart illustrating processing procedures of the manufacturing method according to this embodiment. The manufacturing method according to this embodiment is a method that manufactures the GaN substrate 130 from the GaN ingot 100 and includes a holding step 1001, a peeling layer forming step 1002, and a peeling step 1003. The manufacturing method according to this embodiment is a method that manufactures the GaN substrate 130 by forming a peeling layer 110 in the GaN ingot 100, breaking the GaN ingot 100 at the peeling layer 110 along the set of crystal planes (3-1), and peeling the GaN substrate 130 from the GaN ingot 100, and is a method that can reduce cleavage along the set of crystal planes (3-2) than before by arraying a plurality of focal points 19 (see FIG. 4) of applied sub-beams 18 (see FIG. 4) along the crystal orientation perpendicular to the set of crystal planes (3-3), which are relatively harder to be cleaved, and represented by the formula (1) so that a plurality of processing marks 25 (modified layers) formed by the irradiation of the sub-beams 18 is arrayed.

Figure 4:
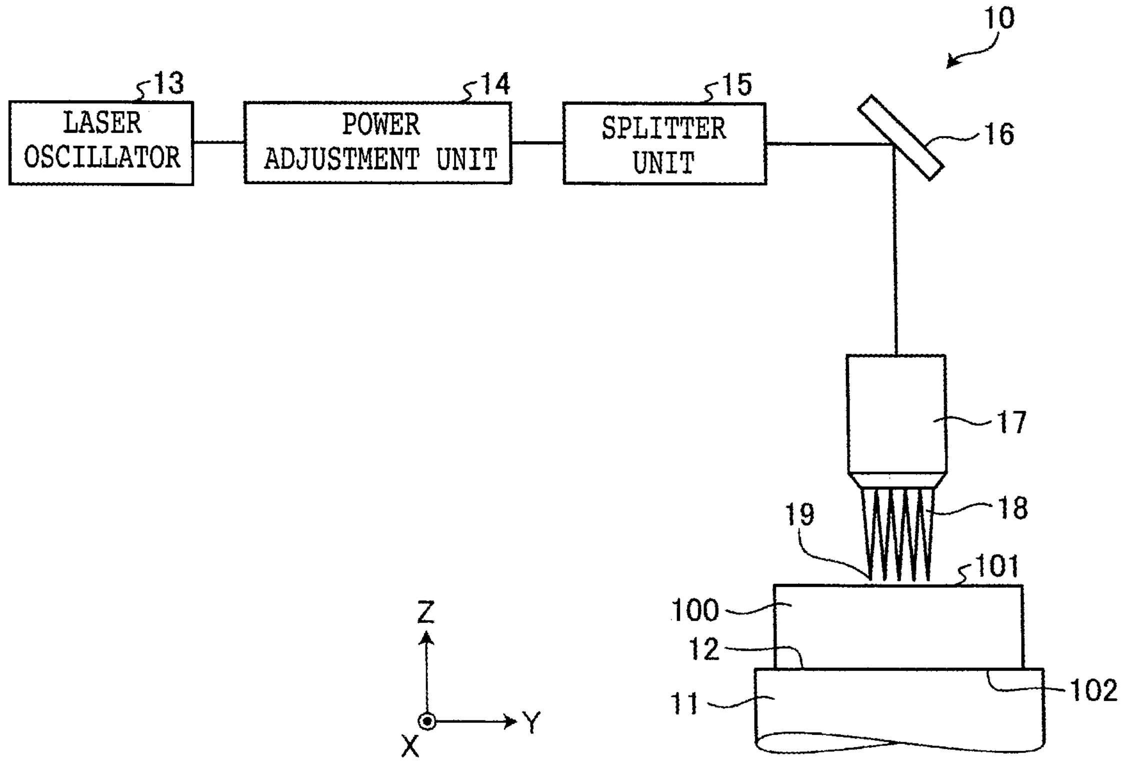
FIG. 4 is a cross-sectional view illustrating a holding step and a peeling layer forming step in FIG. 3.
Figure 5:
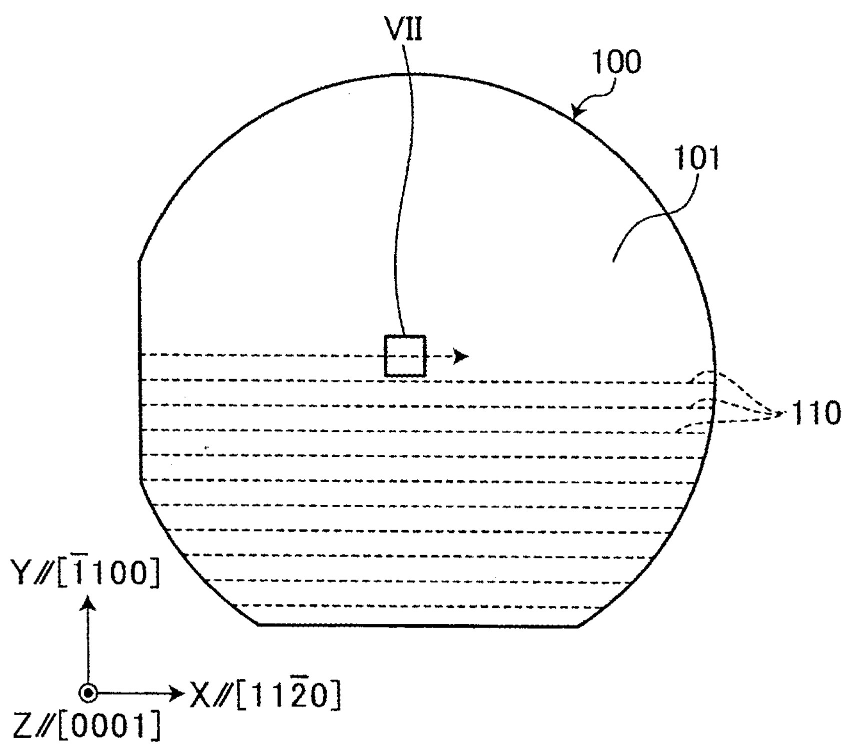
FIG. 5 is a top view illustrating the peeling layer forming step in FIG. 3.
Figure 7:
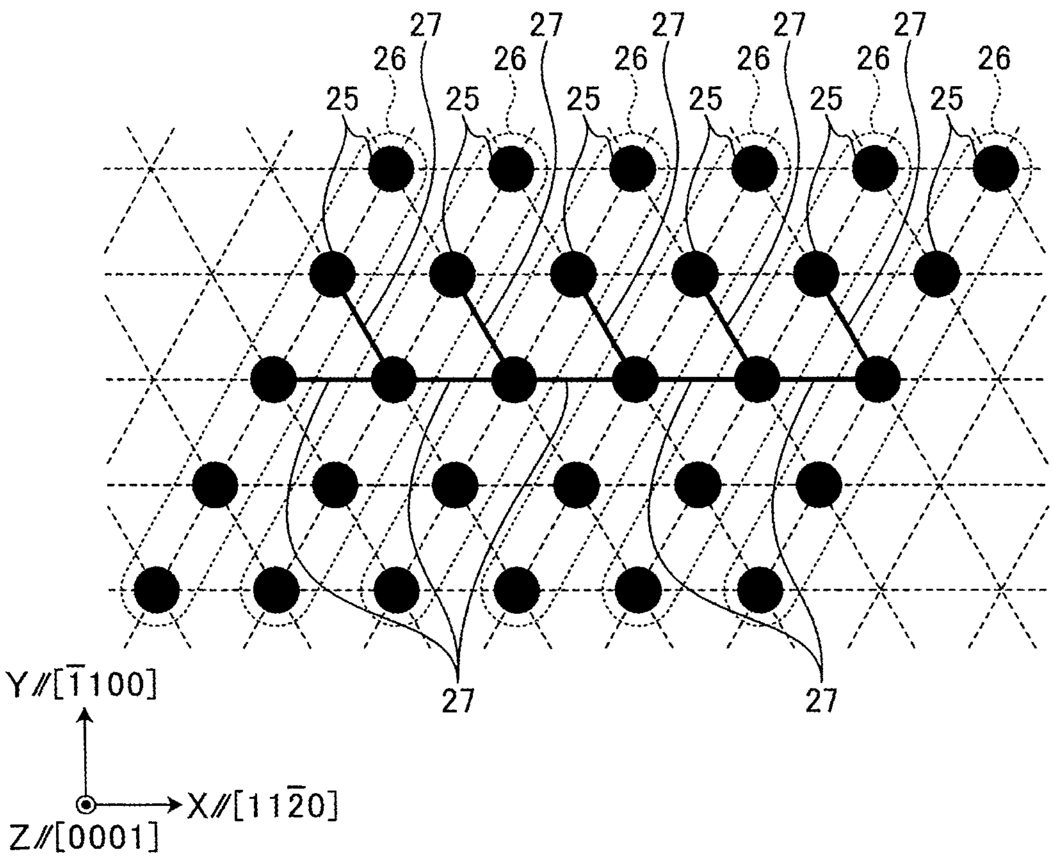
FIG. 7 is a top view illustrating processing marks formed by sub-beams in the peeling layer forming step in FIG. 3.

FIG. 4 is a cross-sectional view illustrating the holding step 1001 and the peeling layer forming step 1002 in FIG. 3. FIG. 5 is a top view illustrating the peeling layer forming step 1002 in FIG. 3. FIGS. 6A to 6D are top views illustrating splitting of a laser beam 18 in the peeling layer forming step 1002 in FIG. 3. FIG. 7 is a top view illustrating the processing marks 25 formed by sub-beams 18 in the peeling layer forming step 1002 in FIG. 3. FIG. 7 is an enlarged view of an area VII in FIG. 5.

The holding step 1001 and the peeling layer forming step 1002 are performed by a laser processing machine 10 illustrated in FIG. 4. As illustrated in FIG. 4, the laser processing machine 10 includes a holding table 11 that holds the GaN ingot 100 on a holding surface 12, a laser oscillator 13, a power adjustment unit 14, a splitter unit 15, a mirror 16, a condenser 17, a moving unit (not illustrated), and a controller (not illustrated).

The holding table 11 is, for example, a chuck table that holds under suction the GaN ingot 100 on the holding surface 12 from a side of the second surface 102 with a side of the first surface 101 kept exposed. The holding table 11 is disposed rotatably by a rotary drive source (not illustrated) about an axis of rotation parallel to a Z-axis direction that is a vertical direction and is perpendicular to the holding surface 12.

The laser oscillator 13 emits the laser beam 18 of a wavelength having transmissivity for GaN (the GaN ingot 100). For example, the laser oscillator 13 has Nd:YAG, Nd:$YVO_4$, or the like as a laser medium, and emits a pulsed (for example, several tens of MHz) laser beam 18 of a wavelength (for example, 1,064 nm) having transmissivity for GaN (the GaN ingot 100).

The power adjustment unit 14 adjusts the power of the laser beam 18 emitted by the laser oscillator 13. The power adjustment unit 14 is, for example, an acousto-optic modulator (AOM), and is operated according to input electrical signals, whereby the laser beam 18 is repeatedly deflected for a predetermined time according to the signals and is converted into a burst mode through repeated thinning out for the predetermined time. In this embodiment, the laser beam 18 adjusted through the power adjustment unit 14 has a pulse-repetition frequency of approximately several kHz to several tens of kHz (for example, 50 kHz), and the number of bursts ranging from approximately several bursts to a dozen of bursts (for example, ten bursts).

The splitter unit 15 splits the laser beam 18, the power of which has been adjusted by the power adjustment unit 14, into a plurality of sub-beams (approximately several sub-beams to a dozen of sub-beams, 5 sub-beams in the example illustrated in FIG. 4) at predetermined intervals in a predetermined direction on an X-Y plane. Although the splitter unit 15 has, for example, a liquid crystal on silicon-spatial light modulator (LCOS-SLM), a diffraction grating may also be used instead of the LCOS-SLM.

The mirror 16 reflects the sub-beams 18 split by the splitter unit 15 and changes the directions of their optical paths. The condenser 17 condenses the sub-beams 18 reflected by the mirror 16, forms the focal points 19, and applies the sub-beams 18 to the GaN ingot 100. It is to be noted that in this embodiment, the spot diameter of each focal point 19 is set to approximately several μm (for example, approximately 5 μm).

The moving unit relatively moves the GaN ingot 100, which is held on the holding table 11, and the focal points 19 of the sub-beams 18, which have been formed by the condenser 17, along a processing feed direction and an indexing feed direction by relatively moving the holding table 11 and the condenser 17 along the processing feed direction and the indexing feed direction. Here, in this embodiment, the processing feed direction is set in an X-axis direction of the laser processing machine 10, and the indexing feed direction is set in a Y-axis direction of the laser processing machine 10.

The controller of the laser processing machine 10 controls operations of individual elements of the laser processing machine 10 to make the laser processing machine 10 perform the holding step 1001 and the peeling layer forming step 1002. In this embodiment, the controller of the laser processing machine 10 includes a computer system. The computer system that the controller of the laser processing machine 10 includes has a processor having a microprocessor such as a central processing unit (CPU), a memory such as a read only memory (ROM) or a random access memory (RAM), and an input/output interface device. The processor of the controller of the laser processing machine 10 performs processing according to a computer program stored in the storage device of the controller of the laser processing machine 10, and outputs control signals to the individual elements of the laser processing machine 10 via the input/output interface device of the controller of the laser processing machine 10 to control the laser processing machine 10.

The holding step 1001 holds the GaN ingot 100 on the holding table 11 of the laser processing machine 10 as illustrated in FIG. 4. Specifically, in the holding step 1001, the GaN ingot 100 is transferred onto the holding table 11 by a transfer unit (not illustrated) or the like, and the GaN ingot 100 is placed on the holding surface 12 with the side of the first surface 101 directed upward. After the GaN ingot 100 has been held under suction on the side of the second surface 102 on the holding surface 12 of the holding table 11, the holding table 11 is rotated about a Z-axis by the rotary drive source (not illustrated) to perform an alignment so that the orientation flat 104, which is formed parallel to the crystal orientation (2-3) of the GaN ingot 100, extends along the processing feed direction (the X-axis direction of the laser processing machine 10). In the holding step 1001, setting is therefore performed such that the crystal orientation (2-3) of the GaN ingot 100 held on the holding table 11 extends along the X-axis direction of the laser processing machine 10 and the crystal orientation (2-2) of the GaN ingot 100 held on the holding table 11 extends along the Y-axis direction of the laser processing machine 10.

It is to be noted that the holding step 1001 is not limited to the foregoing in the present invention and is sufficient if a specific one of the set of crystal orientations represented by the above-described formula (1) of the GaN ingot 100 held on the holding table 11 extends along the X-axis direction of the laser processing machine 10. Here, the specific one of the set of crystal orientations represented by the above-described formula (1) means any one of the crystal orientation (2-3), crystal orientation (2-4), and crystal orientation (2-5) in this embodiment. Further, the expression "to perform an alignment (setting is performed) so as to extend along the predetermined orientation or direction" means that the angle to be formed between the specific one crystal orientation and the predetermined orientation or direction is adjusted (set) to 5° or smaller.

As illustrated in FIGS. 4 and 5, the peeling layer forming step 1002 forms the peeling layer 110 at a depth, which corresponds to a thickness 120 (see FIG. 8) of the GaN substrate 130 to be manufactured, by relatively moving the GaN ingot 100 and the focal points 19 along the direction of the crystal orientation of the GaN ingot 100 as represented by the above-described formula (1), with the focal points 19 of the sub-beams 18, which transmit through GaN (the GaN ingot 100), positioned inside the GaN ingot 100 from the first surface 101.

In this embodiment, the peeling layer forming step 1002 includes a laser beam irradiation step and an indexing feed step. The peeling layer forming step 1002 forms the peeling layers 110, each of which includes a plurality of modified layers and cracks spreading from the modified layers, inside the GaN ingot 100 along a direction parallel to the first surface 101 by alternately performing the laser beam irradiation step and the indexing feed step after performing the holding step 1001.

The laser beam irradiation step forms the modified layers and cracks, which spread from the modified layers, inside the GaN ingot 100 along the direction parallel to the first surface 101 by applying the sub-beams 18 from the condenser 17 while relatively moving (feeding for processing) the focal points 19 of the sub-beams 18 and the GaN ingot 100 by the moving unit along the processing feed direction, that is, the direction of the specific one crystal orientation (the crystal orientation (2-3) in this embodiment) that is parallel to the first surface 101 of the GaN ingot 100 and is included in the set of crystal orientations as represented by the above-described formula (1). When the sub-beams 18 are applied to the GaN ingot 100 in the laser beam irradiation step, the modified layers are formed along a line, the line having been irradiated with the sub-beams 18 and being parallel to the processing feed direction, around the focal points 19 of the sub-beams 18, and along the direction parallel to the first surface 101, and the cracks are formed spreading from both sides of the modified layers and along the direction parallel to the first surface 101. It is to be noted that the modified layers are regions in each of which, for example, one or more of the density, refractive index, mechanical strength, and other physical properties have changed to a level or levels different from the corresponding one or ones of surrounding regions.

Further, in the laser beam irradiation step of the peeling layer forming step 1002 in this embodiment, the splitter unit 15 of the laser processing machine 10 is set such that the laser beam 18 is split to form the focal points 19 and the straight lines 21 connecting the individual split focal points 19 each other each extend along the direction parallel to the direction of the specific one crystal orientation included in the set of crystal orientations as represented by the above-described formula (1). Described in more detail, the laser beam irradiation step of the peeling layer forming step 1002 is set such that with respect to the focal points 19 formed by splitting the laser beam 18 through the splitter unit 15, the straight lines 21 connecting the mutually adjacent focal points 19 to each other each extend along the direction parallel to the direction of the specific one crystal orientation included in the set of crystal orientations represented by the formula (1).

It is to be noted that, in the laser beam irradiation step of the peeling layer forming step 1002, the setting value of intervals of the mutually adjacent focal points 19 formed by splitting the laser beam 18 through the splitter unit 15 is 5 μm or greater and 20 μm or smaller (for example, 14.4 μm) in this embodiment. The expression "the mutually adjacent focal points 19" means pairs of focal points 19, in each of which the interval between the respective focal points 19 falls within a range of its setting value plus a predetermined error set beforehand. In this embodiment, the predetermined error is ±10% or smaller, with ±5% or smaller being preferred.

In the laser beam irradiation step of the peeling layer forming step 1002, the focal points 19 formed by splitting the laser beam 18 through the splitter unit 15 can be arrayed owing to the setting as described above so that, as illustrated in FIGS. 6A to 6D, they all come to intersection points of a grid formed by the three kinds of specific crystal orientations included in the set of crystal orientations as represented by the formula (1) and having, as the length of one side of each triangle of the grid, the setting value of the intervals of the mutually adjacent focal points 19.

Figures 6A, 6B, 6C, 6D:
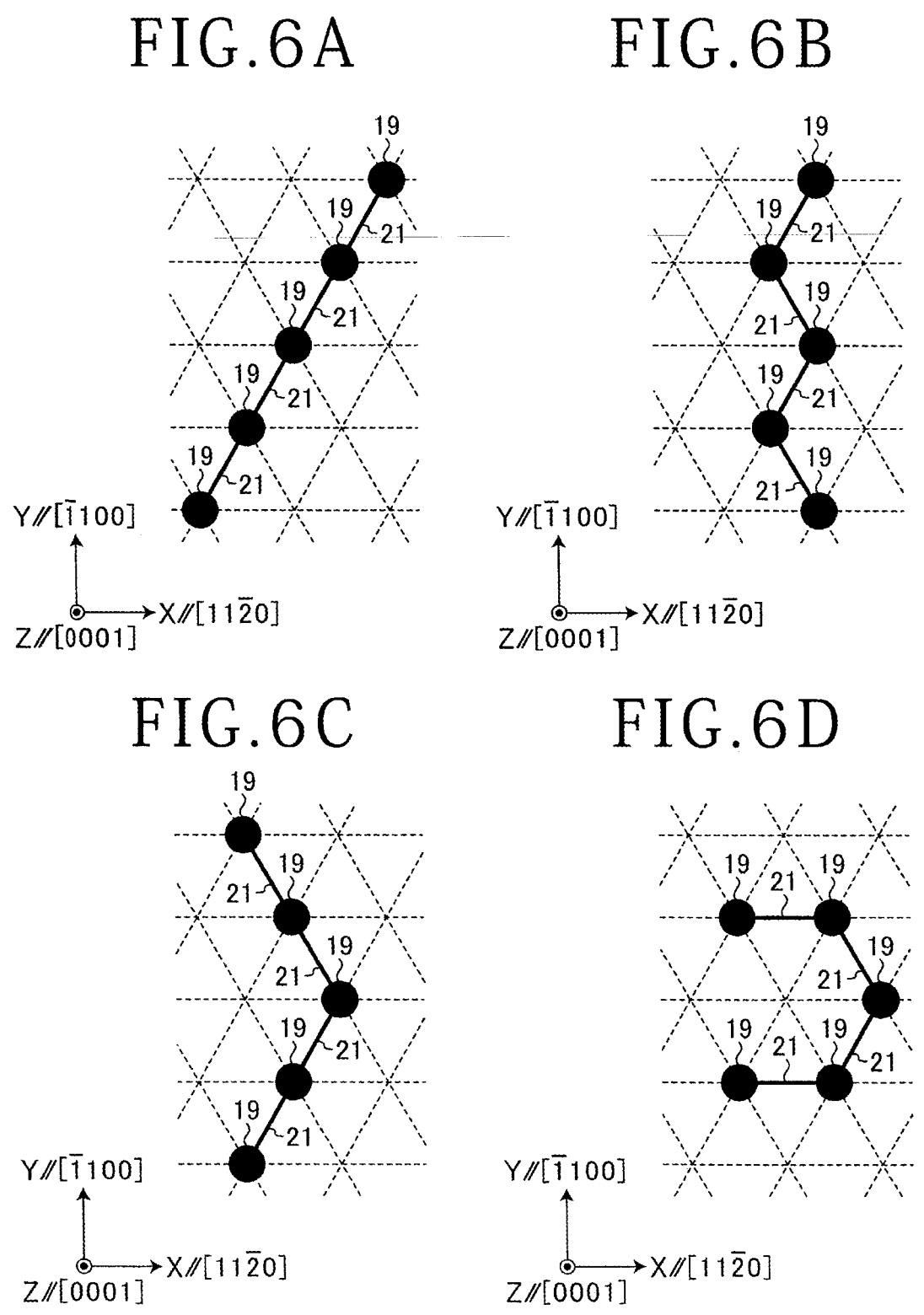

Specifically, in a splitting pattern of the focal points 19 of the sub-beams 18 as illustrated in FIG. 6A, four straight lines 21 that connect the mutually adjacent focal points 19 to each other all extend successively from a lower side toward an upper side of the paper sheet of FIGS. 6A to 6D along a direction parallel to the crystal orientation (2-4). In a splitting pattern of the focal points 19 of the sub-beams 18 as illustrated in FIG. 6B, straight lines 21 that connect the mutually adjacent focal points 19 to each other extend successively from a lower side toward an upper side of the paper sheet of FIGS. 6A to 6D along a direction parallel to the crystal orientation (2-5), along a direction parallel to the crystal orientation (2-4), along the direction parallel to the crystal orientation (2-5), and along the direction parallel to the crystal orientation (2-4), respectively. In a splitting pattern of the focal points 19 of the sub-beams 18 as illustrated in FIG. 6C, straight lines 21 that connect the mutually adjacent focal points 19 to each other extend successively from a lower side toward an upper side of the paper sheet of FIGS. 6A to 6D along a direction parallel to the crystal orientation (2-4), along the direction parallel to the crystal orientation (2-4), along a direction parallel to the crystal orientation (2-5), and along the direction parallel to the crystal orientation (2-5), respectively. In a splitting pattern of the focal points 19 of the sub-beams 18 as illustrated in FIG. 6D, straight lines 21 that connect the mutually adjacent focal points 19 to each other extend successively from a lower side toward an upper side of the paper sheet of FIGS. 6A to 6D along a direction parallel to the crystal orientation (2-3), along a direction parallel to the crystal orientation (2-4), along a direction parallel to the crystal orientation (2-5), and along the direction parallel to the crystal orientation (2-3), respectively.

Further, the laser beam irradiation step of the peeling layer forming step 1002 is preferably set such that at least one of the straight lines 21 connecting the individual split focal points 19 to each other intersects the processing feed direction along which the GaN ingot 100 and the focal points 19 of the sub-beams 18 are relatively moved, and extends along the direction parallel to the direction of the specific one crystal orientation included in the set of crystal orientations as represented by the above-described formula (1). In other words, in the laser beam irradiation step of the peeling layer forming step 1002, the splitter unit 15 is preferably set such that at least some of the focal points 19 are split in the direction intersecting the processing feed direction and extending parallel to the direction of the specific one crystal orientation included in the set of crystal orientations as represented by the above-described formula (1). In all the splitting patterns illustrated in FIGS. 6A, 6B, 6C, and 6D, for example, at least one straight line 21 intersects the crystal orientation (2-3) as the processing feed direction and extends along the direction parallel to the crystal orientation (2-4) or crystal orientation (2-5) as the specific one crystal orientation included in the set of crystal orientations as represented by the above-described formula (1). The splitting patterns illustrated in FIGS. 6A, 6B, 6C, and 6D are hence preferred patterns. In such cases, the laser beam irradiation step of the peeling layer forming step 1002 can array the processing marks 25 over a wide range by performing the laser beam irradiation step once, in other words, by applying the sub-beams 18 through a single processing feed.

The laser beam irradiation step of the peeling layer forming step 1002 may also be set such that all the straight lines 21 connecting the individual split focal points 19 to each other intersect the processing feed direction along which the GaN ingot 100 and the focal points 19 of the sub-beams 18 are relatively moved, and extend along the direction parallel to the direction of the specific one crystal orientation included in the set of crystal orientations as represented by the above-described formula (1). In other words, in the laser beam irradiation step of the peeling layer forming step 1002, the splitter unit 15 may also be set such that all the focal points 19 are split in the direction intersecting the processing feed direction and extending parallel to the direction of the specific one crystal orientation included in the set of crystal orientations as represented by the above-described formula (1). In all the splitting patterns illustrated in FIGS. 6A, 6B, and 6C, for example, all the straight lines 21 intersect the crystal orientation (2-3) as the processing feed direction and extend along the direction parallel to the crystal orientation (2-4) or crystal orientation (2-5) as the specific one crystal orientation included in the set of crystal orientations as represented by the above-described formula (1). In such cases, the laser beam irradiation step of the peeling layer forming step 1002 can array the processing marks 25 over a wider range by performing the laser beam irradiation step once, in other words, by applying the sub-beams 18 through a single processing feed.

The laser beam irradiation step of the peeling layer forming step 1002 may also be set such that some of the straight lines 21 connecting the individual split focal points 19 to each other extend along the direction parallel to the processing feed direction along which the GaN ingot 100 and the focal points 19 of the sub-beams 18 are relatively moved, and also the direction parallel to the direction of the specific one crystal orientation included in the set of crystal orientations as represented by the above-described formula (1). In other words, in the laser beam irradiation step of the peeling layer forming step 1002, the splitter unit 15 may be set such that some of the focal points 19 are split in the direction parallel to the processing feed direction and also the direction parallel to the direction of the specific one crystal orientation included in the set of crystal orientations as represented by the above-described formula (1). In the splitting pattern illustrated in FIG. 6D, for example, some of the straight lines 21 extend along the direction parallel to the crystal orientation (2-3) as the processing feed direction, and also the direction parallel to the crystal orientation (2-3) as the specific one crystal orientation included in the set of crystal orientations as represented by the above-described formula (1). In such a case, the laser beam irradiation step of the peeling layer forming step 1002 can once perform the laser beam irradiation step earlier, in other words, the irradiation of the sub-beams 18 through a single processing feed, because the relative moving speed (processing feed rate) between the GaN ingot 100 and the focal points 19 can be set faster as will be mentioned subsequently herein.

In the laser beam irradiation step of the peeling layer forming step 1002 in this embodiment, the controller of the laser processing machine 10 may also set the relative moving speed (processing feed rate) by the moving unit between the GaN ingot 100 and the focal points 19, which have been formed by splitting the laser beam 18, so that, as illustrated in FIG. 7, straight lines 27 connecting the formed adjacent processing marks 25 are each formed along the direction of any specific one crystal orientation, which is included in the set of crystal orientations as represented by the formula (1), by relatively moving (feeding for processing) the GaN ingot 100 and the focal points 19.

In the laser beam irradiation step of the peeling layer forming step 1002, the processing marks 25 in a group (a processing mark group 26), the group being in the same array as the group of focal points 19 illustrated in FIG. 6A, are formed as illustrated in FIG. 7 when the sub-beams 18 are applied to the GaN ingot 100 to form the group of focal points 19. In the laser beam irradiation step of the peeling layer forming step 1002, the controller of the laser processing machine 10 also sets the processing feed rate based on the time interval of the irradiation of the sub-beams 18 so that the product of the time interval of the irradiation of the sub-beams 19 and the processing feed rate becomes an integer multiple of the spacing between the mutually adjacent focal points (the length of the straight lines 21). Here, this integer multiple is preferably such a minimum value that the focal points 19 of the sub-beams 18 to be applied next will not overlap the positions to which the sub-beams 18 have been applied right before. If the sub-beams 18 are applied, for example, in the pattern illustrated in FIG. 6A, 6B, or 6C, it is preferred to set the processing feed rate with this integer multiple set to one times (to be equal). If the sub-beams 18 are applied in the pattern illustrated in FIG. 6D, on the other hand, it is preferred to set the processing feed rate with this integer multiple set to two times. In the laser beam irradiation step of the peeling layer forming step 1002, the processing feed rate is set to approximately several hundreds of mm/s (for example, 875 mm/s) in this embodiment.

In the laser beam irradiation step of the peeling layer forming step 1002, the straight lines 27 that connect the adjacent processing marks 25 to each other between the formed adjacent processing mark groups 26 are each formed along the direction of any specific one crystal orientation, which is included in the set of crystal orientations as represented by the formula (1), as illustrated in FIG. 7 by setting the processing feed rate as described above. As also illustrated in FIG. 7, the individual processing marks 25 in the processing mark groups 26 formed by applying the sub-beams 18 a plurality of times can be arrayed so that they come to intersection points of a grid formed by the three kinds of specific crystal orientations included in the set of crystal orientations as represented by the formula (1) and having, as the length of one side of each triangle of the grid, the setting value of the intervals of the mutually adjacent focal points 19.

In the indexing feed step, the controller of the laser processing machine 10 relatively feeds, by the moving unit, the GaN ingot 100 and the focal points 19 of the sub-beams 18 for indexing along the indexing feed direction, specifically, along a direction parallel to the first surface 101 of the GaN ingot 100 and perpendicular to the processing feed direction along which the GaN ingot 100 and the focal points 19 of the sub-beams 18 are relatively moved when modified layers are formed in the laser beam irradiation step. In the indexing feed step of the peeling layer forming step 1002, a length over which the indexing feed is performed (an indexing feed amount) is set to approximately 100 μm (for example, 106 μm) in this embodiment. It is to be noted that the indexing feed amount may also be set such that the processing mark groups 26 formed in the laser beam irradiation step right before each indexing feed will overlap processing mark groups 26 to be formed in the laser beam irradiation step right after the indexing feed.

By alternately performing the laser beam irradiation step and the indexing feed step on the GaN ingot 100, modified layers are formed along a plurality of lines parallel to the processing feed direction, around the focal points 19 of the sub-beams 18, and along the direction parallel to the first surface 101, and cracks spreading from the modified layers formed along the adjacent lines are connected to each other. By applying a predetermined external force to the GaN ingot 100, the GaN substrate 130 that includes the first surface 101 and has the thickness 120 corresponding to the depth of the focal points 19 of the sub-beams 18 from the first surface 101 when the focal points 19 are positioned inside the GaN ingot 100 can be severed using, as a start point, the peeling layer 110 that includes these modified layers and cracks.

Figures 8, 9:
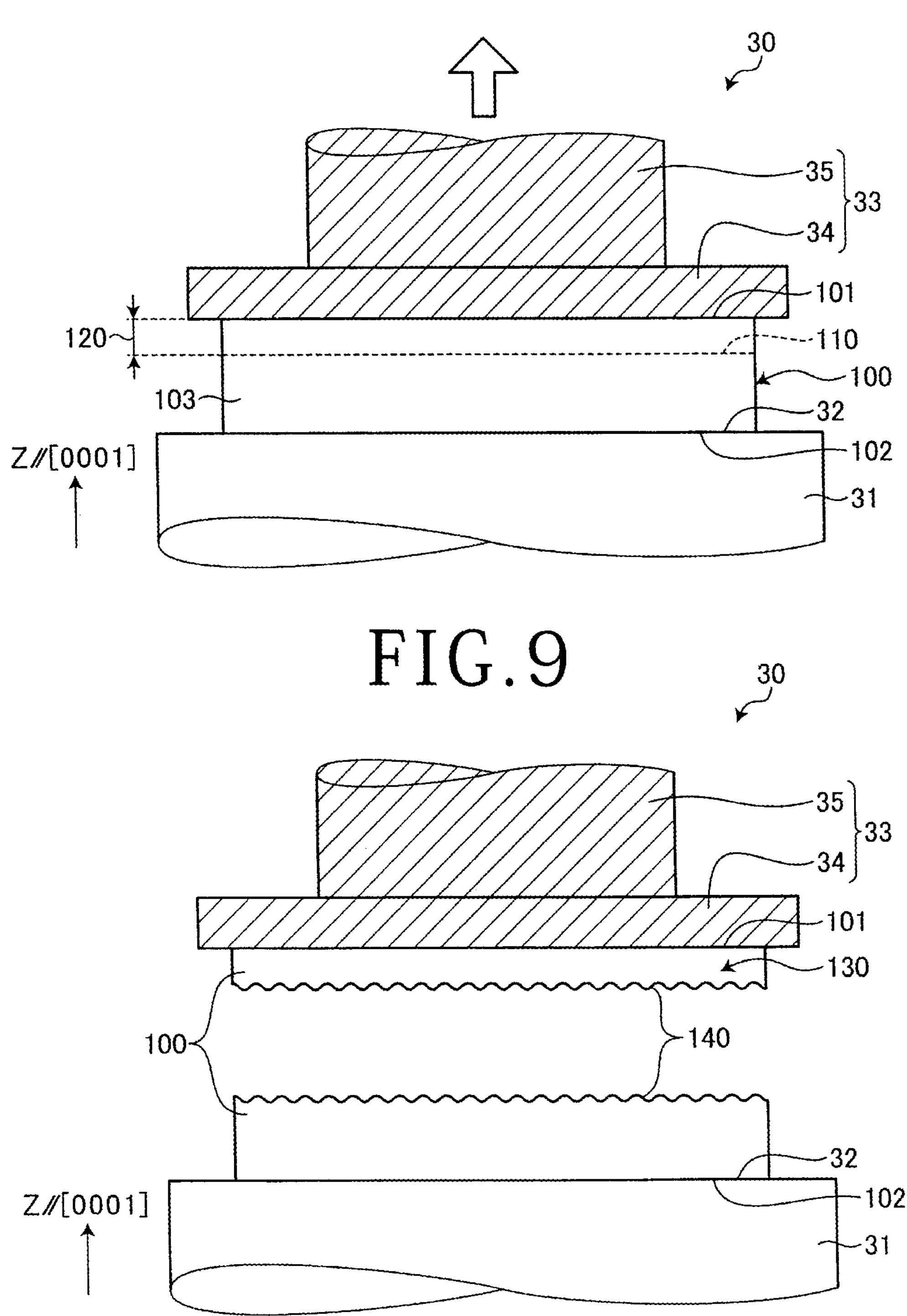
FIG. 8 is a cross-sectional view illustrating a peeling step in FIG. 3.
FIG. 9 is another cross-sectional view illustrating the peeling step in FIG. 3.

FIGS. 8 and 9 are cross-sectional views both illustrating the peeling step 1003 in FIG. 3. As illustrated in FIGS. 8 and 9, the peeling step 1003 severs the GaN substrate 130 from the GaN ingot 100 using the peeling layer 110 as the start point. The peeling step 1003 is performed by a peeling machine 30 illustrated in FIGS. 8 ad 9. As illustrated in FIGS. 8 and 9, the peeling machine 30 includes a holding table 31 that holds the GaN ingot 100 on a holding surface 32, a peeling unit 33, and a controller (not illustrated).

The holding table 31 is similar to the holding table 11 of the above-described laser processing machine 10. The peeling unit 33 includes a suction holding portion 34 and a moving unit 35. The suction holding portion 34 is formed in a disk shape, and on a lower surface thereof, holds the first surface 101 of the GaN ingot 100. The moving unit 35 relatively moves the holding table 31 and the suction holding portion 34, for example, along a Z-axis direction. The moving unit 35 can apply a force to pull the GaN ingot 100 along the Z-axis direction by applying a power in a direction to relatively separate from each other, to the suction holding portion 34 on which the first surface 101 of the GaN ingot 100 held on the holding table 31 is held under suction, with respect to the holding table 31 along the Z-axis direction. The controller of the peeling machine 30 includes a similar computer system as the controller of the laser processing machine 10.

In the peeling step 1003, the GaN substrate 130 is severed from the GaN ingot 100 between severed surfaces 140 using the peeling layer 110 as the start point as illustrated in FIGS. 8 and 9 by holding the GaN ingot 100 under suction on the holding surface 32 of the holding table 31 from the side of the second surface 102 with the side of the first surface 101 kept exposed, and, after suction holding of the first surface 101 of the GaN ingot 100 by the suction holding portion 34 of the peeling unit 33, applying, with the moving unit 35 of the peeling unit 33, a force to pull the GaN ingot 100, which is held on the holding table 31, along the Z-axis direction.

In the manufacturing method according to this embodiment, an external force application step such as insertion of a wedge or application of an ultrasound may also be performed after the performance of the peeling layer forming step 1002 and before the performance of the peeling step 1003, or at the same time as the performance of the peeling step 1003.

In the external force application step, the cracks in the peeling layer 110 is allowed to spread further along the direction parallel to the first surface 101, for example, by driving the wedge into the peripheral surface 103 of the GaN ingot 100 at the height position of the peeling layer 110. It is to be noted that the wedge can be driven in at a single location, but a plurality of wedges may be driven in at a like plurality of locations along a peripheral direction of the GaN ingot 100.

In the external force application step, the cracks in the peeling layer 110 is also allowed to spread further along the direction parallel to the first surface 101 by applying an ultrasound (elastic vibration waves of a frequency band exceeding 20 kHz) to the GaN ingot 100 instead of driving the wedge. If this is the case, an ultrasound is applied to the side of the first surface 101 via a liquid such as pure water in the external force application step before holding under suction the first surface 101 of the GaN ingot 100 on the lower surface of the suction holding portion 34. Specifically, in the external force application step, a liquid with an ultrasound applied thereto may be ejected toward the first surface 101 of the GaN ingot 100, or an ultrasound may be applied to the side of the first surface 101 of the GaN ingot 100 from an ultrasound horn via a liquid. Further, the cracks in the peeling layer 110 are more preferably allowed to spread still further along the direction parallel to the first surface 101 by first applying an ultrasound to a localized area of approximately 5 to 50 mm diameter on the side of the first surface 101 of the GaN ingot 100, and then gradually widening the area to which the ultrasound is to be applied.

By performing the external force application step, the cracks are connected to each other between the adjacent modified layers, so that the mechanical strength of the peeling layer 110 is reduced further compared with that of the regions other than the peeling layer 110 in the GaN ingot 100. The GaN substrate 130 can therefore be severed from the GaN ingot 100 with a small force compared with the case in which the external force application step is not performed.

In the peeling layer forming step 1002 of the gallium nitride substrate manufacturing method according the embodiment having such configurations as described above, the splitter unit 15 of the laser processing machine 10 is set so that the laser beam 18 is split to form the focal points 19 and the straight lines 21 connecting the individual split focal points 19 to each other each extend along the direction parallel to the direction of the specific one crystal orientation included in the set of crystal orientations as represented by the above-described formula (1). The gallium nitride substrate manufacturing method according this embodiment can therefore array the group of processing marks 25 (modified layers), which have been formed by the irradiation of the sub-beams 18, so that, similarly to the focal points 19, the straight lines 21 connecting the mutually adjacent processing marks 25 (modified layers) to each other each extend along the direction parallel to the direction of the specific one crystal orientation included in the set of crystal orientations as represented by the above-described formula (1), and hence can reduce the possibility of occurrence of cracks (cleavage), which cause an increase of irregularities of the severed surfaces 140, along the set of crystal planes (3-2). The manufacturing method according to this embodiment can reduce the irregularities of the severed surfaces 140 by allowing the cracks in the peeling layer 110 to preferably spread along the direction parallel to the first surface 101, thereby exhibiting an advantageous effect in that the GaN substrate 130 can be efficiently sliced and manufactured from the GaN ingot 100.

Further, the laser beam irradiation step of the peeling layer forming step 1002 in the gallium nitride substrate manufacturing method according to this embodiment is set such that at least one of the straight lines 21 connecting the individual split focal points 19 to each other intersects the processing feed direction along which the GaN ingot 100 and the focal points 19 of the sub-beams 18 are relatively moved, and extends along the direction parallel to the direction of the specific one crystal orientation included in the set of crystal orientations as represented by the above-described formula (1). The gallium nitride substrate manufacturing method according to this embodiment can therefore array the processing marks 25 over a wide range by performing the laser beam irradiation step once, in other words, by applying the sub-beams 18 through a single processing feed, thereby exhibiting an advantageous effect in that the GaN substrate 130 can be more efficiently sliced and manufactured from the GaN ingot 100.

In the manufacturing method according to this embodiment, the controller of the laser processing machine 10 may also set the relative moving speed (processing feed rate) by the moving unit between the GaN ingot 100 and the focal points 19, which have been formed by splitting the laser beam 18, so that, as illustrated in FIG. 7, the straight lines 27 connecting the formed adjacent processing marks 25 are each formed along the direction of any specific one crystal orientation, which is included in the set of crystal orientations as represented by the formula (1), by relatively moving (feeding for processing) the GaN ingot 100 and the focal points 19. The gallium nitride substrate manufacturing method according this embodiment can therefore array the individual processing marks 25 of the processing mark groups 26, which have been formed by applying the sub-beams 18 a plurality of times, so that, similarly to the focal points 19, the straight lines 21 connecting the adjacent processing marks 25 (modified layers) between the mutually adjacent processing mark groups 26 each extend along the direction parallel to the direction of the specific one crystal orientation included in the set of crystal orientations as represented by the above-described formula (1), and hence can further reduce the possibility of occurrence of cracks (cleavage), which cause an increase of irregularities of the severed surfaces 140, along the set of crystal planes (3-2). The gallium nitride substrate manufacturing method according to this embodiment can therefore reduce the irregularities of the severed surfaces 140 further by allowing the cracks in the peeling layer 110 to more preferably spread along the direction parallel to the first surface 101, thereby exhibiting an advantageous effect in that the GaN substrate 130 can be more efficiently sliced and manufactured from the GaN ingot 100.

The present invention is not limited to the details of the above-described preferred embodiment. The scope of the invention is defined by the appended claims and all changes and modifications as fall within the equivalence of the scope of the claims are therefore to be embraced by the invention.

What is claimed is:

1. A manufacturing method of a gallium nitride substrate from a gallium nitride ingot having a first surface and a second surface on a side opposite to the first surface, the method comprising:

a holding step of holding the gallium nitride ingot, a peeling layer forming step of forming a peeling layer at a depth, which corresponds to a thickness of the gallium nitride substrate to be manufactured, by splitting a laser beam of a wavelength, which transmits through gallium nitride to form a plurality of focal points, such that each of the plurality of focal points contribute to formation of the peeling layer, and relatively moving the gallium nitride ingot and the plurality of focal points, with the focal points positioned inside the gallium nitride ingot from the first surface; and a peeling step of peeling the gallium nitride substrate from the gallium nitride ingot using the peeling layer as a start point, wherein:

the peeling layer forming step is set such that the laser beam is split to form the plurality of focal points and straight lines connecting the individual split focal points each extend along a direction parallel to the direction of the crystal orientation represented by a below-described formula (1), wherein at least one of the straight lines is oriented obliquely with respect to the direction of relative movement between the gallium nitride ingot and the plurality of focal points $$\langle 1\ 1\ \bar{2}\ 0\rangle. \qquad \text{Formula (1)}$$

2. The manufacturing method according to claim 1, wherein all of the straight lines connecting the individual split focal points are oriented obliquely with respect to the direction of relative movement between the gallium nitride ingot and the plurality of focal points.

3. The manufacturing method according to claim 1, wherein, in the peeling layer forming step, a relative moving speed between the gallium nitride ingot and the plurality of focal points is set such that straight lines connecting adjacent processing marks formed by relatively moving the gallium nitride ingot and the plurality of focal points are each formed along the direction of the crystal orientation represented by the formula (1).

4. The manufacturing method according to claim 1, wherein the straight lines connecting the individual split focal points include one or more straight lines extending along crystal orientations included in the set of crystal orientations represented by formula (1).

5. The manufacturing method according to claim 4, wherein the straight lines connecting the individual split focal points include a single straight line extending along a crystal orientation represented by formula (1).

6. The manufacturing method according to claim 4, wherein the straight lines connecting the individual split focal points include:

at least one straight line extending along a first crystal orientation represented by formula (1), and at least one straight line extending along a second, different crystal orientation represented by formula (1).

7. The manufacturing method according to claim 6, wherein the straight lines connecting the individual split focal points further include:

at least one straight line extending along a third different crystal orientation represented by formula (1).

8. The manufacturing method according to claim 6, wherein adjacent ones of the straight lines extend along a different one of the first and second crystal orientations.

9. The manufacturing method according to claim 6, wherein straight lines connecting mutually adjacent focal points of the plurality of focal points extend successively along different crystal orientations included in the set of crystal orientations represented by formula (1).

10. The manufacturing method according to claim 1, wherein the crystal orientations represented by formula (1) include non-polar crystal orientations of the gallium nitride ingot.

11. The manufacturing method according to claim 1, wherein mutually adjacent focal points along each of the straight lines are arranged at substantially equal intervals.

12. The manufacturing method according to claim 11, wherein the substantially equal intervals between mutually adjacent focal points are uniform along each of the straight lines.

13. The manufacturing method according to claim 11, wherein the substantially equal intervals between mutually adjacent focal points along each straight line are the same among the plurality of straight lines.

14. The manufacturing method according to claim 1, wherein the peeling layer is formed continuously along the straight lines connecting the adjacent focal points, and wherein the peeling layer serves as a crack initiation layer extending along the crystal orientations represented by formula (1).

* * * * *